(No Model.)
W. SEABROOK.
MOUTH PIECE FOR PIPES.
No. 318,210. Patented May 19, 1885.
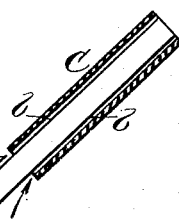
Fig. 3
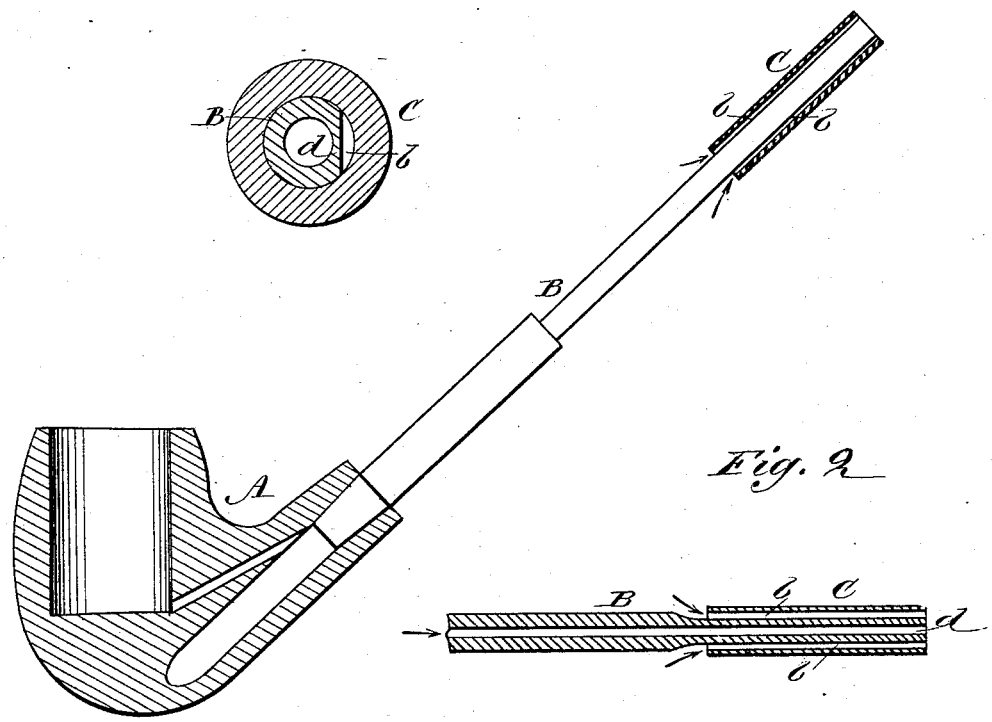
Fig. 1
Fig. 2
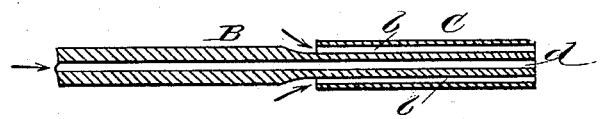
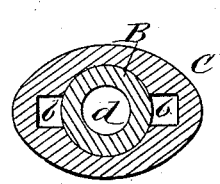
Fig. 4
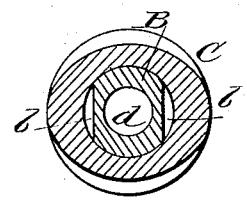
Fig. 5
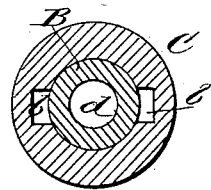
Fig. 6
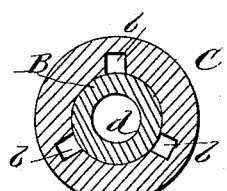
Fig. 7
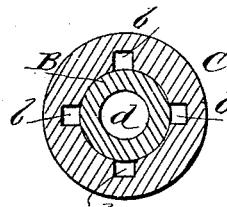
Fig. 8
WITNESSES:
C. Neveux
C. Sedgwick
INVENTOR:
W. Seabrook
BY Munn & Co
ATTORNEYS.

UNITED STATES PATENT OFFICE.

WILLIAM SEABROOK, OF EDISTO ISLAND, SOUTH CAROLINA.

MOUTH-PIECE FOR PIPES.

SPECIFICATION forming part of Letters Patent No. 318,210, dated May 19, 1885.

Application filed March 22, 1884. (No model.)

*To all whom it may concern:*

Be it known that I, WILLIAM SEABROOK, of Edisto Island, in the county of Colleton and State of South Carolina, have invented certain new and useful Improvements in Pipe-Stems or Mouth-Pieces Thereof, of which the following is a full, clear, and exact description.

This invention relates to the stems or tubes of smoking-pipes, whereby provision is made when inhaling the smoke for also drawing into the mouth by one or more separate apertures or covered ducts a current or currents of air from outside the stem to cool the inhaled smoke, and thereby to make the act of smoking more agreeable.

Reference is to be had to the accompanying drawings, forming a part of this specification, in which similar letters of reference indicate corresponding parts in all the figures.

Figure 1 represents a partly sectional longitudinal view of a pipe with stem and attached mouth-piece embodying my invention; Fig. 2, a longitudinal section of a modified construction of the stem in part with mouth-piece attached; and Figs. 3, 4, 5, 6, 7, and 8, transverse sections, upon a larger scale, of further modifications of the stem and mouth-piece.

The pipe-bowl A is shown provided with a removable stem, B, in the usual manner. To the outer end of the latter a cylindrical mouth-piece, C, is applied, the same being independent and detachable, although fitting so closely as to retain its place when in use. This detachable mouth-piece is so constructed relatively to the stem B as to provide lengthwise passages $b$, which serve as ducts for admitting fresh and cool air into the mouth of the smoker at each inhalation.

The stem or mouth-piece may be variously constructed for this purpose. Thus, as shown in Fig. 1, the mouth-piece C may be a cylindrical or other shaped separate attachment slipped over the mouth-end portion of the stem, with the inhaling-air ducts $b$ made longitudinally through it on its inner surface. Fig. 2 shows a close-fitting mouth-piece with the air-ducts $b$ made by reductions in the stem where it passes through the mouth-piece. Fig. 3 shows a like construction, but with the reduction in the stem to form an air-duct, $b$, on only one side of it. Figs. 4, 5, 6, 7, and 8 show substantially the same constructions as illustrated in Figs. 1 and 2, but representing differently-shaped mouth-pieces C and air-ducts $b$ in the mouth-piece or stem of varying shape and numbers.

I do not claim a mouth-piece having air-ducts, since that is not new; but what I do claim is—

The removable mouth-piece C, having the open channels or grooves $b$, extending from end to end thereof and formed in the wall of its central bore, which is adapted to receive a pipe-stem, whereby when the device is applied in use the pipe-stem forms the inner side of said channels, thus converting them into isolated air-ducts, as specified.

WILLIAM SEABROOK.

Witnesses:
E. J. JENKINS,
R. H. SEABROOK.